(No Model.)
J. REID.
Velocipede.
No. 236,259. Patented Jan. 4, 1881.
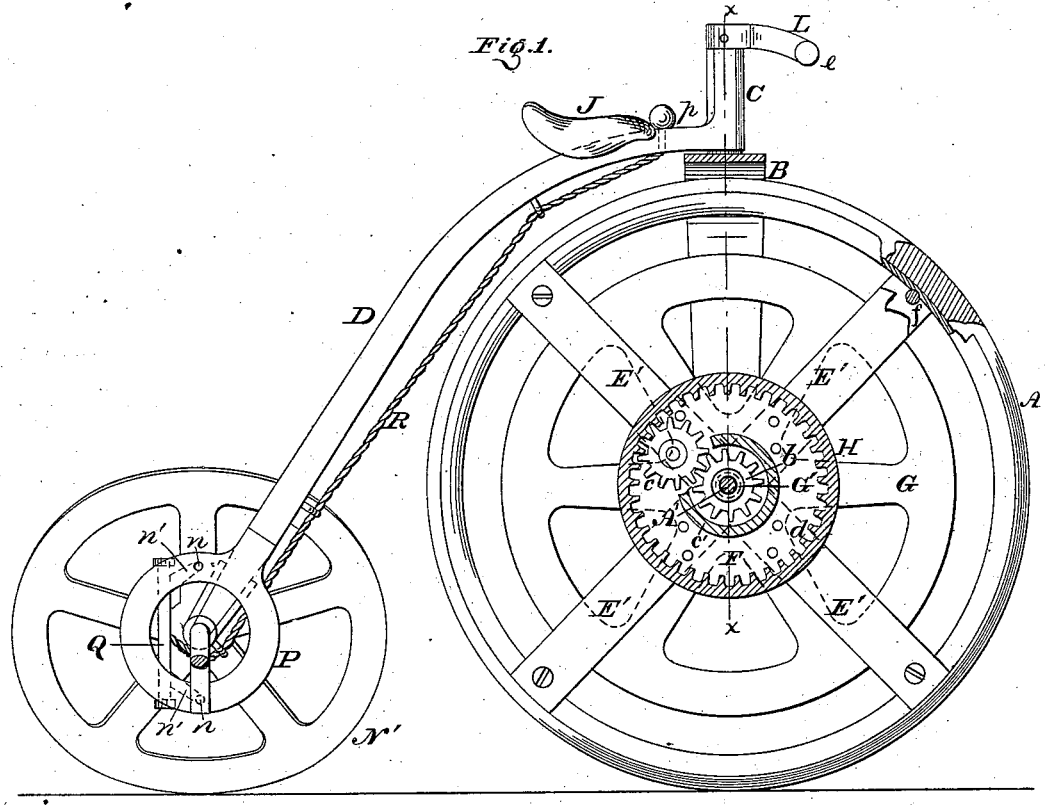
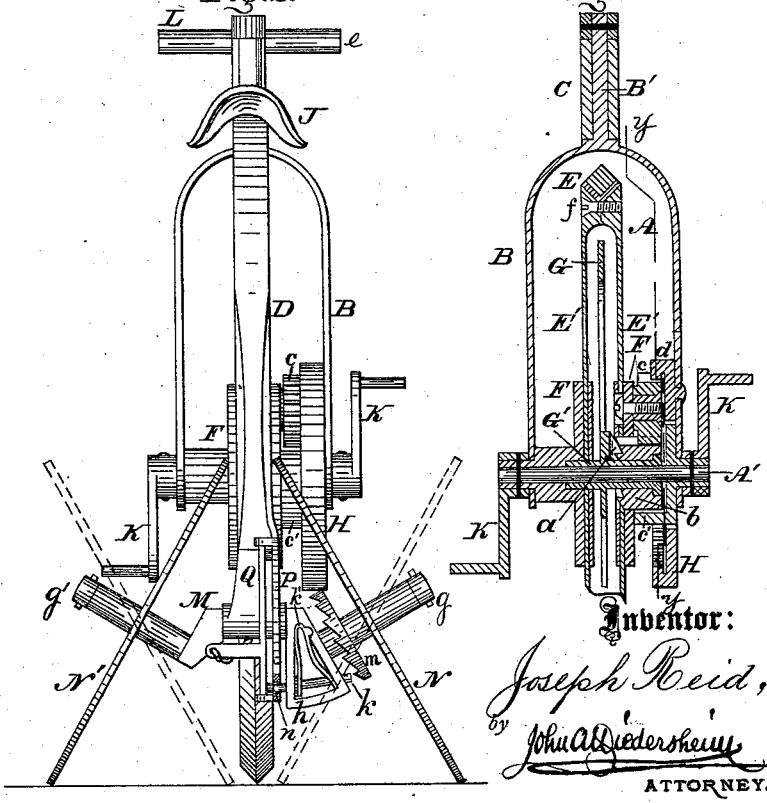
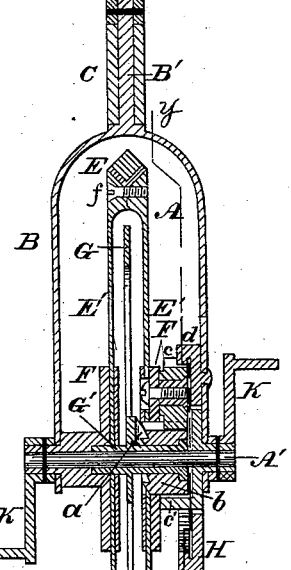
Witnesses:
A. P. Grant,
W. F. Kircher
Inventor:
Joseph Reid,
by John A. Wiedersheim
ATTORNEY.

UNITED STATES PATENT OFFICE.

JOSEPH REID, OF WYANDOTTE, KANSAS.

VELOCIPEDE.

SPECIFICATION forming part of Letters Patent No. 236,259, dated January 4, 1881.

Application filed May 1, 1880. (No model.)

*To all whom it may concern:*

Be it known that I, JOSEPH REID, a citizen of the United States, residing at Wyandotte, in the county of Wyandotte and State of Kansas, have invented a new and useful Improvement in Velocipedes, which improvement is fully set forth in the following specification and accompanying drawings, in which—

Figure 1 is a side elevation, partly sectional, of the velocipede embodying my invention. Fig. 2 is a rear view thereof. Fig. 3 is a vertical section of a portion in line $xx$, Fig. 1.

Similar letters of reference indicate corresponding parts in the several figures.

My invention consists of a gyroscopic wheel fitted to the driving or guide wheel of a velocipede, and sleeved on the shaft of said driving-wheel, and adapted to rotate with greater rapidity than said driving-wheel, the gyroscopic power derived serving to increase the ease of operation of the velocipede, impart uniformity of motion thereto, and prevent overturning of the same.

It also consists of one or all of the wheels having a V or other proper shaped rim, which is rigidly connected to arms by means of bolts common to both.

It also consists of means for converting the velocipede into a bicycle or tricycle.

Referring to the drawings, A represents a wheel, which is mounted, by means of an axle, A', on a bifurcated arm, B, to whose upper end is connected a post, B', passed freely through a boss, C, at the front end of the reach D, said wheel constituting the power and steering wheel, and located at the front of the velocipede.

The wheel A is formed of a V or other proper shaped rim, E, to which are connected a series of arms, E', attached to the hub or hub-disks F, so that within the arms a space exists for a gyroscopic wheel, G; but I do not confine myself to this arrangement, for like results can be had by placing the gyroscopic wheel alongside instead of between the arms of driving or guide wheel. The gyroscopic wheel G is rigidly fixed to a hollow axle or shaft, G', which is fitted to revolve freely on axle A'. On one end of hollow shaft G' a center pinion, $b$, is fitted to revolve freely, and to one side of this pinion is secured or with one side is formed a ratchet-wheel, which engages with a pawl, $a$, by means of which the motion of the center pinion is communicated to the gyroscopic wheel G. This ratchet arrangement allows the gyroscopic wheel to continue its motion if the velocipede is suddenly stopped; but I equally claim making the center pinion fast to the hollow shaft G', in which case the gyroscopic wheel G acts as a fly-wheel and imparts uniformity of motion to the velocipede. The center pinion meshes with a pinion, $c$, which is mounted on one of the hub-disks F of the wheel A, and meshes with the internally-toothed rim $d$ of a disk, H, which is rigidly connected to one limb of the bifurcated standard B, the axle A' passing through said disk H.

J represents the driver's seat, and K the foot-cranks or treadles on the ends of the axle A'. L represents the steering-tiller, which is secured to the top of the post B', and has its grasping portion $e$ in advance of said post.

A circular guard, $c'$, is secured to the plate F centrally, so as to shield the wheel $b$, and carries at its outer end the seat for a boss of one of the treadles K by which motion is imparted to the wheel A. The periphery of the guard is also cut away to admit the wheel $c$, which, as has been stated, meshes with the wheel $b$.

The operation is as follows: The rider occupies the seat J and operates the cranks K so as to impart motion to the wheel A. As the wheel $c$ is carried around with the hub or disk F, and as it gears with the toothed rim $d$, it rotates on its axis and imparts rotation to the center pinion, which, owing to the tooth or pawl $a$, rotates the gyroscopic wheel G, the speed whereof is greater than the wheel A. By this provision the velocipede may be run with great rapidity and ease, the motion is uniform, and the liability of overturning is overcome, due to the gyroscopic impulse of the wheel G.

The inner sides of the outer ends of the arms E' are fitted to embrace the outer sides of the rim E. Bolts or screws $f$ are passed through openings in the arms and grooves or openings in the rim, thus rigidly connecting the arms and rim and preventing slipping of either part.

To the rear of the reach D is journaled a crank-axle, M, the ends g g' of which form journals for the hind wheels N N, said ends extending diagonally or angularly, whereby when said axle M is turned or shifted the two wheels may stand wide apart or flare above or below, as shown in Fig. 2.

Attached to the journal g is a supporting-piece, h, for a sliding pin or pawl, k, which is adapted to engage with a ratchet, m, on the hub of the wheel N, said pawl being pressed from the ratchet by means of a spring, k', connected to the piece h. At the rear of the reach in an annulus, P, having at opposite places openings n, into either of which the inner end of the pawl k is caused to drop, and thus lock the axle M and reach D. Pivoted to the annulus is a lever, Q, whose ends are bent or otherwise constructed to form fingers n', (see Fig. 1,) which may enter either of the openings n, and thus force out the pawl k. To the lever Q is attached a cord or chain, R, which passes along the reach, and is provided with a button, p, or other suitable handle for operating purposes.

It will be noticed that when the axle M is rotated or shifted so that the parts of the wheels N N' in contact with the ground approach each other, as shown by the dotted lines, Fig. 2, they form so narrow a support or base, almost equal to a single wheel, that the velocipede may be run as a bicycle. When, however, it is desired to have a tricycle the button p is drawn, thus moving the lever Q, whereby the respective finger n' pushes the pawl k from the opening n in the annulus and disengages said pawl and annulus, so that the axle M may make a half-turn, and when the pawl reaches the other opening n it drops thereinto and again locks the axle and reach. The two wheels N N' now present a broad base or flare at the part in contact with the ground, as shown by the full lines, Fig. 2.

The reconversion of the velocipede into a bicycle is readily accomplished by again drawing on the button p, the other operations being repeated.

When the velocipede is running as a bicycle its conversion into a tricycle may be utilized as a means of steadying while stopping the vehicle, owing to the broader wheel-base secured. When the velocipede is considered as a bicycle the gyroscopic force so adjusts the direction of the front wheel, A, as to keep its base directly under the center of gravity in the vehicle and its load, thereby greatly assisting the rider in managing the vehicle. In fact, if the freedom of the front wheel be not interfered with and it is at liberty to turn in its guide-boss C, the gyroscopic force will maintain the vehicle in the erect position with perfect security—such, for instance, as when going down a hill, when the feet may be off the cranks, or in any other case when the front wheel is free to turn obedient to the gyroscopic impulse of the wheel G.

Having thus described my invention, what I claim as new, and desire to secure by Letters Patent, is—

1. A velocipede having a gyroscopic wheel rotating faster than the driving-wheel, and sleeved on the shaft thereof.

2. The wheel A, in combination with the gyroscopic wheel G and the gearing b c d, substantially as and for the purpose set forth.

3. The center pinion, in combination with the ratchet-wheel and pawl a and the gyroscopic wheel G, substantially as described, and for the purpose set forth.

4. The V or other proper shaped rim E, in combination with the arms E' and the screws or bolts f passed through said rim and arms and the inclosed gyroscopic wheel, and giving room for gyroscopic wheel between arms, substantially as and for the purpose set forth.

5. The hind wheels, fitted on angular or diagonal journals of a rotable crank-axle, substantially as described, whereby the width of the wheel-base may be increased or diminished, for the purpose set forth.

6. The hind wheels (one or both) provided with a ratchet, m, the crank-axle M, with the pawl k, the annulus P, and lever Q, combined and operating substantially as and for the purpose set forth.

7. A velocipede having a gyroscopic wheel connected by pawl and ratchet and suitable gearing to the driving-wheel, substantially as set forth.

JOSEPH REID.

Witnesses:
GEORGE STUMPF,
GUSTAVUS J. NEUBERT.